UNITED STATES PATENT OFFICE.

ERNST F. W. WIEDA, OF PATERSON, NEW JERSEY.

LACTEAL MIXTURE AND METHOD OF MAKING THE SAME.

1,159,455.    Specification of Letters Patent.    Patented Nov. 9, 1915.

No Drawing.    Application filed January 25, 1915.   Serial No. 4,352.

*To all whom it may concern:*

Be it known that I, ERNST F. W. WIEDA, a citizen of the United States, residing at Paterson, in the county of Passaic and State of New Jersey, have invented a certain new and useful Improved Lacteal Mixture and Method of Making the Same, of which the following is a specification.

This invention relates to the manufacture of lacteal food products and it consists, first, in a novel method of preparing a lacteal food product in which, among other advantages, the fat globules or fat-including solid constituents shall be retained in a state of separation from each other; second, in the product of this method; third, in the method first stated, when supplemented by desiccation, thereby to produce a dried lacteal food product which will resist deterioration for a materially longer period than ordinary so-called dried milk or milk powder and the like; and, fourth, in the product of the latter method.

According to this invention, the lacteal content and some viscous innocuous substance that is soluble in water, for instance, gelatin, sugar, starch, certain gums, albumen and the like, are subjected to some operation, as emulsifying or homogenizing, whereby the lacteal content and the viscous substance are broken up each into a highly divided state and thoroughly mixed together.

This treatment has certain well defined advantages. In the first place, the product of the treatment if retained in the liquid state will have the fat globules or fat-including solid particles not only highly divided but homogeneously distributed in or thoroughly disseminated throughout the mixture and separated from each other, such particles being retained in this condition by the liquid constituent of the mixture, on account of the viscosity imparted thereto by the viscous substances, long after the time when the fat particles would otherwise agglomerate as cream. If the product of this treatment is desiccated, there is the further advantage that the resulting powder may be kept for a considerably longer period of time than ordinary milk powders; for, upon drying, each fat-globule or fat-including particle will be found to have an enveloping deposit of the substance (gelatin, sugar, starch, gum, albumen, etc.) which imparted viscosity to the liquid constituent of the mixture dried thereon and forming a protection to such particle from the deteriorating influences of the atmosphere.

If desired, a mixture of the two ingredients may first be formed and in this case the viscous substance may be introduced into the mixture either in the solid state, to be allowed to dissolve in the liquid constituent of the lacteal content, or in liquid form.

The drying of milk or other lacteal products is known to deprive the milk of certain qualities, notably its natural viscosity, so that when restored to the liquid condition its taste is flat, insipid and unnatural. My treatment has the still further arvantage that when the dried product is dissolved in a suitable quantity of water to restore it to the liquid state the viscosity, and consequently the flavor, remains substantially the same as the viscosity and flavor of natural milk.

My invention will be found to possess certain other advantages, according to the nature of the product, whether liquid or dry, according to the kind of substance used to impart viscidity to the liquid with which the lacteal content is associated, and according to the specific purpose for which it is to be used. For instance, in the making of a mixture suitable for conversion by freezing into ice cream (as disclosed in my allowed application Serial No. 817,460), using, for example, sugar 8 lbs., gelatin ¼ lb., cream (20%) 6.4 qts., skimmilk 16 qts., mixing these ingredients together, and then passing the mixture through an emulsifying or homogenizing apparatus, the product is one which, when it has been converted into ice cream, is very much more free of either the gritty or granular condition, or any tendency to assume such condition on standing, than ordinary ice cream mixtures, has an unusually smooth texture and pleasing taste, and affords a considerable economy in that the "swell" or increase in bulk resulting from the freezing is greater than when ordinary ice cream mixtures are used, these qualities being attributable to the fact that, with what is known in the ice-cream maker's art as a "binder" (gelatin, in the present instance) present, the emulsification leaves the lacteal content and the binder so thoroughly broken up and uniformly distributed throughout the mixture that when the mixture is frozen and then left to stand crystallization is prevented from ensuing, and that in the freezing process the incidental agitation causes air to be incorporated in the frozen product in superior quantity due to the highly divided state of the solid constituents composed principally of butter fat.

I have desiccated a mixture such as that specifically indicated above as suitable for use in making ice cream after homogenizing or emulsifying the same, producing an ice cream powder that has great self-preserving properties, on account of the enveloping of each fat-globule or fat-including particle thereof with a coating of the substance that imparts viscosity to the mixture (sugar and gelatin) and that may be readily converted into use in a freezer by dissolving it in a suitable quantity of water.

Mixing the lacteal content and the viscous substance before emulsification is not indispensable, but it is apparent that the desired homogeneity of disposition of the fat-including particles in the product will perhaps best and certainly most simply be accomplished if this is done.

I claim:

1. The hereindescribed method of preparing a lacteal food product which consists in breaking up a lacteal liquid and a viscous substance soluble in water each into a highly divided state and thoroughly mixing them together.

2. The hereindescribed food product containing, with a lacteal content, a viscous substance soluble in water, the lacteal content being broken up into a highly divided state and homogeneously distributed in the mixture.

3. The hereindescribed method of forming a lacteal food product consisting in preparing a mixture containing, with the lacteal content, a viscous substance soluble in water, and then breaking up the lacteal content and the viscous substance each into a highly divided state and mixing them together.

4. The hereindescribed method of preparing a lacteal food product which consists in breaking up a lacteal liquid and a viscous substance each into a highly divided state and thoroughly mixing them together, and finally desiccating the mixture.

5. The hereindescribed lacteal powder having a deposit of dried viscous substance enveloping each fat-including particle thereof.

In testimony whereof I affix my signature in presence of two witnesses.

ERNST F. W. WIEDA.

Witnesses:
JOHN W. STEWARD,
WM. D. BELL.